United States Patent [19]

Sovilla

[11] 4,401,706
[45] Aug. 30, 1983

[54] MULTI-PLY HEAT-INSULATING MATERIAL

[76] Inventor: Heinz Sovilla, 2, Terrailles, 1304 - Cossonay, Switzerland

[21] Appl. No.: 315,469

[22] Filed: Oct. 27, 1981

[30] Foreign Application Priority Data

Oct. 29, 1980 [CH] Switzerland .................. 80238/80

[51] Int. Cl.³ .................. B32B 3/28; B32B 3/12; B32B 15/12
[52] U.S. Cl. .................. 428/158; 156/210; 428/166; 428/172; 428/178; 428/184; 428/186; 428/304.4; 428/332; 428/920
[58] Field of Search .................. 428/72, 76, 186, 166, 428/178, 304.4, 314.2, 172, 920, 184, 332, 158, 159; 156/210

[56] References Cited

U.S. PATENT DOCUMENTS

| | | | |
|---|---|---|---|
| 798,804 | 9/1905 | Kunz | 428/920 |
| 2,221,309 | 11/1940 | Gazelle | 428/186 |
| 3,619,340 | 11/1971 | Jones | 428/166 |
| 3,840,425 | 10/1974 | Finelli et al. | 428/920 |
| 3,940,811 | 3/1976 | Tomikawa et al. | 428/304.4 |
| 4,313,993 | 2/1982 | McGlory | 428/178 |

Primary Examiner—Paul J. Thibodeau
Attorney, Agent, or Firm—Robert E. Burns; Emmanuel J. Lobato; Bruce L. Adams

[57] ABSTRACT

This heat-insulating material comprises at least one layer of plain paper or plastic web provided on one face with a thin metal film having a thickness of 1 to 20 microns, and at least one layer of corrugated paper or pasteboard glued only along the crests of its waves to the metal coating of the first layer, the side of the corrugated web which faces the plain web layer being likewise coated with a metal film. Thus, substantially the entire area of the two metal layers are in constant mutual contact with the cavities formed by the waves of the corrugated web, which have a thickness of at least 1 to 1.5 mm. This feature and the specific arrangement of the layers are such that the metallized surfaces thereof face the direction in which the heat-flow is to be insulated, thus affording a particularly high heat-insulating efficiency.

10 Claims, 9 Drawing Figures

MULTI-PLY HEAT-INSULATING MATERIAL

BACKGROUND OF THE INVENTION

1. Field of the Invention

The present invention relates to a multi-ply heat-insulating material in which a plurality of hollow cavities are formed and consisting of layers of non-metallic metallized supporting material.

As distinguished from a conventional heat-insulating material, of which the heat-insulating effect is due almost exclusively to the absorption of heat, in the case of heat-insulating material provided with metal layers the insulating action results essentially from the reflection of the heat radiation. Thus, for example, a flexible material having a symmetrical structure made of two plain plastics layers having sandwiched therebetween a separating layer in the form of a corrugated cellular material is already known (cf. U.S. Pat. No. 4,136,222), the opposite inner faces of the external plastics layers being provided with a mirror-like or specular reflection layer.

A known multi-ply construction element (German Pat. No. 835,522) consists of a plurality of superposed corrugated plastic films, of which the two external ones have their internal faces coated with a metal layer.

Now, however, systematic measurements conducted by the Applicant on various combinations and configurations of heat-insulating materials made of one or several layers proved that the heat carrying capacity of all the test samples was relatively high, when their metal layer or layers were directed towards the heat source or covered directly with another material, that nevertheless, with a fully predetermined arrangement of the metal layers quite surprisingly a reduction in the heat carrying capacity of the order of 30 to 100 percent could be obtained, in comparison with usual combinations of the otherwise identical materials.

SUMMARY OF THE INVENTION

The problem which the present invention is directed to solve was to provide a heat-insulating material of the type broadly mentioned hereinabove and such that its heat-insulating ability be optimal for a given material, a given mass or weight, as well as a given number and a given thickness of the layers or plies, and that it is more efficient in one direction than in the opposite direction.

This problem is solved by the present invention in that the metal layers are each applied uniterally to each one of the sides, facing the same direction, of the layers of supporting material, so as to form directly one portion of the cavity-limiting wall and protect said cavities from a direct flat contact with the adjacent layer, and that the aforesaid direction, in which the sides of the metallized layers are oriented, defines the specific direction in which the heat flow is to be preferably insulated.

Consequently, when the heat-insulating material according to this invention consisting of asymmetrically arranged metallized layers is so oriented that the metallized layers of the strips of material are all directed away from the heat source, it will be observed that the heat insulating effect is quite surprisingly considerably greater than when the same heat-insulating material is directed in the opposite direction, or when in the case of a material having the same structure and the same number of layers, in which however the metal layers are covered directly with another material and thus not exposed to the air contained in the cavities. Furthermore, it was observed also quite surprisingly that the metal coating applied to the other sides of the layers of material which are directed towards the heat source did not produce any additional heat-insulating effect, so that the application of another metal coating on the other layer sides can safely be dispensed with.

The dependency, acknowledged for the first time by the Applicant, of heat-insulation on direction, which has not been described anywhere in the countless literature dealing with heat-insulation and, so far as the Applicant is aware, has never been used in actual practice, may prove very advantageous when using the heat-insulating plates of this invention as wall elements in house-building; in warm southerm Countries it is adequate when the heat flow from inside to outside is stronger than in the opposite direction, so that by day the external heat is prevented from penetrating into the house, while the cooler nights can at the best cool the rooms. The reverse effect, which requires the contrary mounting of heat-insulating plates according to this invention, is desirable for cooler climates where a dispersion of heat from the inner space of the house should be avoided, except from external radiation from the sun, in which case a heat in-flow from the warmed external surfaces of the house to the interior of the house is quite advantageous.

Preferred forms of embodiment of the invention, intended more particularly for use as heat-insulating building and wall elements, are described hereinafter with reference to the accompanying drawings, it being understood that they are given by way of example, not of limitation.

THE DRAWINGS

DESCRIPTION OF THE PREFERRED EMBODIMENTS

Figure 1:
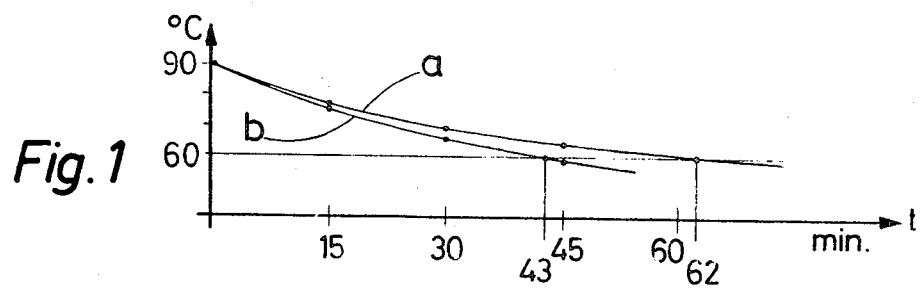
FIG. 1 is a diagram showing the results of essential tests.

The forms of embodiment illustrated in the drawings are generally shown on a larger scale and more particularly the thickness of the layers of material and that of the metal film are not shown to scale.

The basic experiments which led to the present invention consisted in filling with 90° C. hot-water a cylindrical metal container suspended freely and surrounded by a determinate heat-insulating material, and measuring the time required for allowing the water to cool down to 60° C. The container had a diameter of about 8 cm and a height of about 15 cm.

The diagram of FIG. 1, in which the temperature T, in degrees centigrade, are given in ordinates and the time t, in minutes, are given in abscissa, shows two typical cooling curves for the specific case of a known film of terephthalic-acid ethylene-glycol polyester known under the Tradename "Mylar", having a total thickness of 12 microns, and metallized on one side only, and such that the aluminum metal film had a thickness of only about 2 to 4 microns. When the film was fitted to the container so as to contact the latter with its metallized side, the cooling time t was 43 minutes (curve b). In contrast there to, the cooling time t was 62 minutes when the metallized film side was facing outside, that is, in contact with the surrounding atmosphere (curve a).

This effect, which can be increased by using an assembly of two or more layers of a compound heat-insulating material according to this invention, was ascertained experimentally for various combinations of materials. In the case of a combination comprising an inner Mylar-film applied to the outer wall of the container and having its outer side metallized, a PVC-film surrounding the Mylar-film at a distance of about 3 mm, and a second external Mylar-film applied to the outer surface of said PVC-film and having an outwardly-directed metallized face, a 93-minutes cooling time was recorded. In this experiment the free space between the inner Mylar-film and the PVC-film was obtained by using distance-pieces. However, the surprisingly advantageous insulating effect was reduced erratically when in the above-described material combination the second Mylar-film was transferred on the inner side of the PVC-film and turned inside-out so that its metal layer faced the cavity and the container. The cooling time dropped in this case to less than 65 minutes. Otherwise substantially no advantage resulted when disposing the Mylar-film either on the outer side or on the inner side of the PVC-film so that the metallized side was facing outwards of the container's cavity, in comparison with the arrangement in which only the outer side of the PVC-film was provided with a Mylar-film. This proves that what is important is not only that the metal layers constitute an air-barrier, and must therefore prevent any contacts with the adjacent layer, but also the position of the metal layers on the material side opposite the heat source. Likewise, other experiments carried out by using conventional heat-insulating materials according to the present invention and measuring heat-flows evidenced the effects of this invention.

These experiments further proved that the metal layer must be sufficiently thin and have a thickness not in excess of about 20 microns, preferably in the range from only one to about 10 microns, in order to prevent a detrimental heat dissipation. To this end, the heat-insulating materials according to the present invention are provided preferably with Mylar-films in which the metal film thickness is only 1 to 4 microns for a total thickness of 8 to 12 microns, with conventional commercial aluminum films having a thickness of about 4 to 12 microns on a carrier sheet of paper or the like or with metal-films coating the supporting material. With this procedure an additional advantage is obtained in that the weight is kept within particularly low limits. The cross-sectional thickness of the cavities or insulating air cushions should broadly have a minimum value of one millimeter, and preferably 1.5 mm.

In FIGS. 2 to 9 of the drawings the upwardly directed arrows indicate for each form of embodiment the direction in which the heat-flow is to be insulated preferably. The heat source or the room or item to be insulated from heat losses therefore lies constantly beneath the insulating material shown in each example. In case a room or item were to be protected preferably against the penetration of heat, it must be laid atop the above-mentioned insulating materials.

Figure 2:
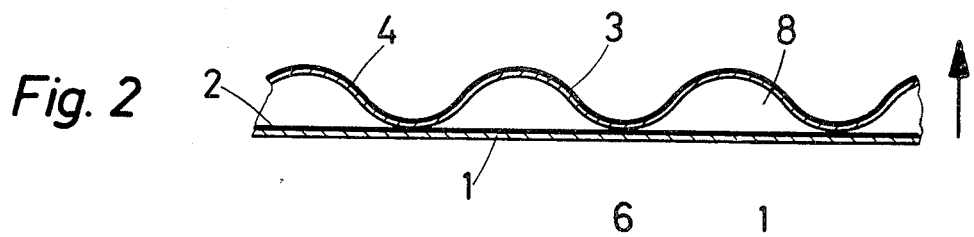
FIG. 2 is a simple basic structure of a heat-insulating material, shown in cross section.

FIG. 2 illustrates a simple basic structure of the heat-insulating material, which comprises on the one hand a plain web of material 1 coated on one face only with a thin metal layer 2 and on the other hand a corrugated web 3 contacting said thin metal layer 2, the face of this corrugated web 3 which is opposite the plain web 1 being likewise coated with a thin metal layer 4; the corrugated web 3 is caused to adhere to the underlying plain web 1 by gluing only the crests of its waves to the metallized surface of said plain web 1. The entire remaining areas of said metal layer 2 are free of adhesives and in direct contact with the insulating air cushions 8 formed in the waves of corrugated web 3. Likewise, the metal layer 4 is in direct contact with the surrounding atmosphere. The gluing operation does not entail any specific difficulties, since machines are known which after shaping the corrugated web 3 apply an adhesive substance only on the tops of the waves of the corrugated web 3 and subsequently cause the latter to engage the plain web 1 for adhering thereto definitively.

The plain web 1 and corrugated web 3 consist preferably of paper or pasteboard having a thickness for example in the range of 0.2 to 0.5 mm. The thickness of the metal layers 2 and 4 should preferably not exceed 20 microns and these layers consist for example of aluminum films glued directly to the paper or pasteboard surfaces, their thickness in this case lying in the range of preferably 8 to 12 microns; alternatively, metallized Mylar-films having preferably a total thickness of 8 to 12 microns and their metal-film only 1 to 3 micron-thick facing the corrugated web 3 may be used. This corrugated web 3 may have a total thickness (i.e. including the waves) of about 1.5 to 5 mm, so that cavities or insulating air-cushions 8 of sufficient size are obtained, with a minimum thickness of at least 1 mm at the top of the waves. The total thickness of a basic structure as shown in FIG. 2 is about 2 to 5 mm.

Possibly, the metal layer 2 applied to the plain web 1 may be somewhat thicker than the one 4 applied to the corrugated web 3 which, for obtaining a satisfactory heat insulating effect, should have a thickness of only one micron or even less than one micron.

Figure 3:
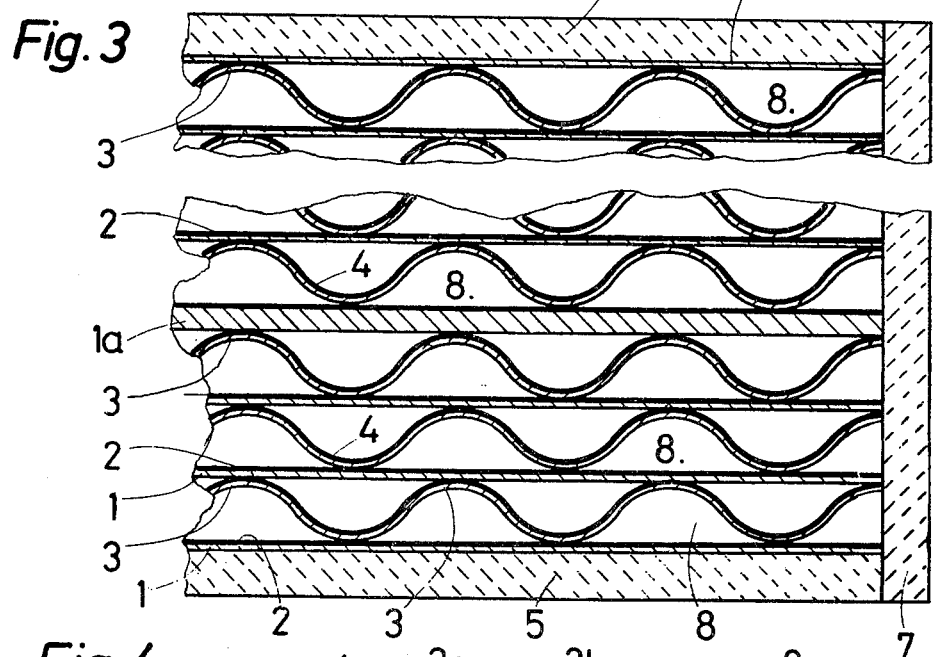
FIG. 3 is a fragmentary view showing in cross section a building or wall element comprising a plurality of basic structures according to FIG. 2.

FIG. 3 illustrates a compound plate intended or suitable for building houses or walls. It consists of a plurality of superposed or stacked basic structures of the type shown in FIG. 2, therefore of a plurality of corrugated paper webs 3 separated by similar but plain paper webs 1. The upper faces of plain webs 1 and corrugated webs 3 are provided with metal layers 2 and 4, respectively. The external top and bottom elements applied to both major surfaces consist of rigid plates 5 and 6, preferably of the asbestos cement sheeting type, and are glued to the external plain webs 1; the small sides may be reinforced with similar plates or layers, one such plate 7 being illustrated in FIG. 3.

A typical wall element according to FIG. 3 has a surface area of 1.8×4.8 square meter and a thickness of about 6 cm, and consists of an assembly of 12 plain webs 3 and as many corrugated webs 3, disposed between external 5-mm thick asbestos cement sheets, as shown. The individual layers consist preferably of fireproof paper having a thickness in the range of about 0.2 to about 0.4 mm, expect for intercalary plain plates 1a disposed every three corrugates webs 3 and having a thickness of about 2.5 to about 3 mm. The thickness of the aluminum layers 2 and 4 is about 4 microns; however, the metal layer 2 carried by the plain webs 1 may also be thicker, if desired.

A wall element of this type is economical, simple to manufacture and can be handled very conveniently, since its weight is extremely low. The stability of this building material meets all practical requirements. The heat-insulating effect, referring to the direction of the arrow of FIG. 3, and notwithstanding the simple and economical manufacture, is exceptionally high, since practically the entire surface of all the metal layers 2 and 4 are in direct contact with the insulating air cushions formed by the cavities 8 so that these are exploited to their maximal heat-insulating capacity.

Figure 4:
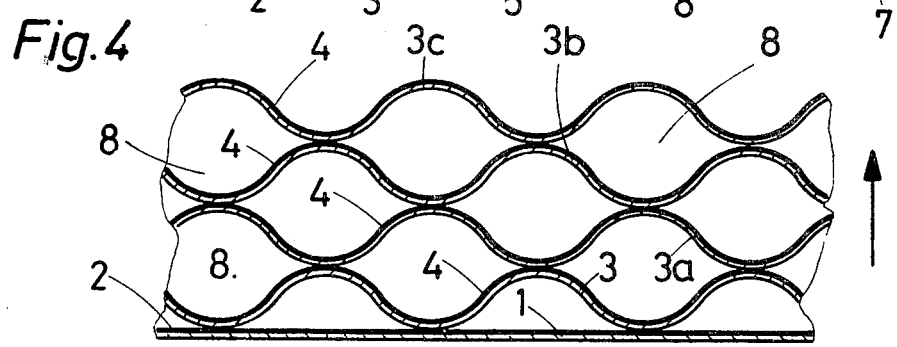
FIGS. 4 to 6 are cross-sectional views showing various other forms of embodiment.

In FIG. 4, four layers of corrugated webs 3, 3a, 3b and 3c are superposed on a plain web 1, each corrugated web being provided on its face opposite said plain web 1 with a metallized film 4. Adjacent corrugated webs are shifted relative to each other by a half-wave pitch and glued to one another along their mutually contacting wave crests, while the corrugated web 3 is glued along its wave crests to the bottommost metal layer 2 of plain web 1. All the plies are exploited to their maximal efficiency according to the present invention, since substantially the entire area of all metal layers 2 and 4 define directly a series of cavities 8.

Figure 5:
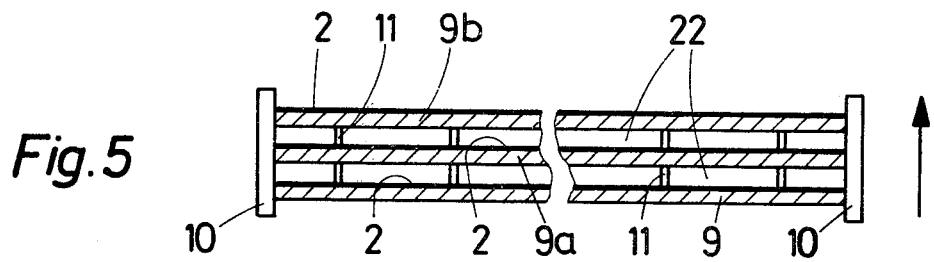

FIG. 5 illustrates three plain webs 9, 9a and 9b braced parallel to each other at a relative spacing of, for example, 1 mm to 2 mm in a frame structure 10, and these three plain webs are each provided on the same side with a metal layer 2. Distance-pieces or spacers 11, for example in the form of small rods, ensure a nearly constant relative spacing and therefore the necessary airgaps 22 between the individual plies.

Figure 6:
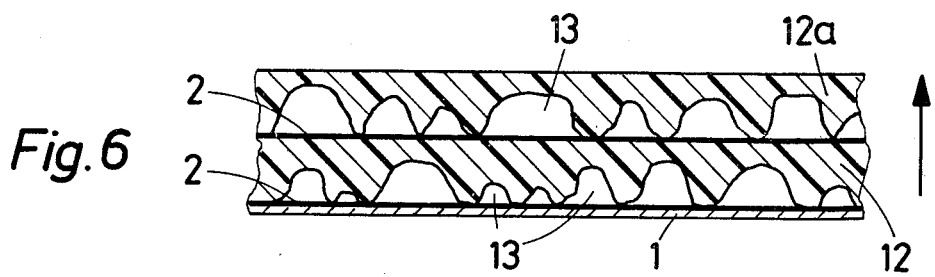

In the example shown in FIG. 6 the heat-insulating material consists of a plain web 1 provided with a metal layer 2 and of two plies 12 and 12a of foamed material glued to each other and to said plain web 1, which are of the open-cell type providing cavities or heat-insulating air-cushions 13. The side of the foamed material web 1 opposite the plain web 1 is provided likewise with a metal layer 2. The cavities can easily be printed or impressed in the heated plastic foamed material consisting preferably of polystyrol, by using corresponding relief shaping rolls or plates, and may have any desired and suitable configuration, for example a honeycomb configuration. In the example illustrated it is assumed that the cavities 13 open only on one side of the plastic foamed plies, and are bounded by the metal layer 2 of the adjacent ply.

Figure 7:
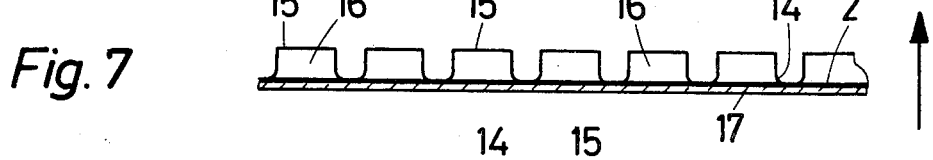
FIGS. 7 and 8 illustrate in cross section and in plane view from above a modified embossed sheeting.
Figure 8:
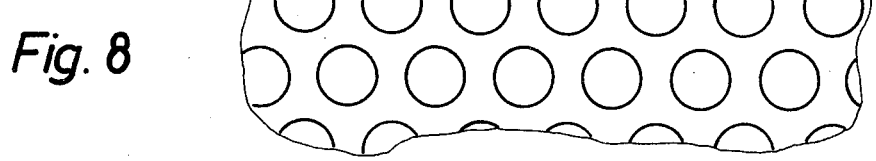

In the examples illustrated in FIGS. 7 and 8 of the drawings the heat-insulating material comprises an embossed film in which projecting bosses or knobs 15 are formed to constitute closed air-pockets, air-cushions or cavities 16. This embossed film consists more particularly of an assembly comprising a film web 14 having undergone a deformation by deep-drawing to form the knobs or bosses 15, and another metallized film web 17 glued to the first film web 14 and having its metal coating 2 deposited on the face of film web 17 which faces the embossed film 15 so as to constitute therewith a flat sealing wall for the air cushions 16. In hitherto known embossed films the air cushions are not in direct contact with a metal film, so that the heat-insulating effect is considerably poorer than that obtained with an embossed film according to this invention which, for example, may be manufactured according to well-known methods from polyethylene stock sheets and may have a total thickness of about 2 to 4 mm, depending on the thickness of said air cushions or pockets 16; the thickness of the metallized film itself may be of the order of about 8 to 20 microns. If desired, two or more layers of said compound embossed films, possibly with the addition of other insulating layers, may be either loosely stacked upon one another and held together by a frame structure, or glued to one another, so that the insulating air-cushions 16 formed by said bosses or knobs 15, as shown in plane view in FIG. 9, bear directly with their major surface area on each metal layer 2. On principle, it is also possible to add a metal film to the inner surface, consequently to the side of the embossed film 14 in which said bosses 15 are deep-drawn. In this case, of course, the insulating material, as shown in the example of FIG. 8, must face the opposite direction, so that the metal layers be oriented in the proper direction.

Figure 9:
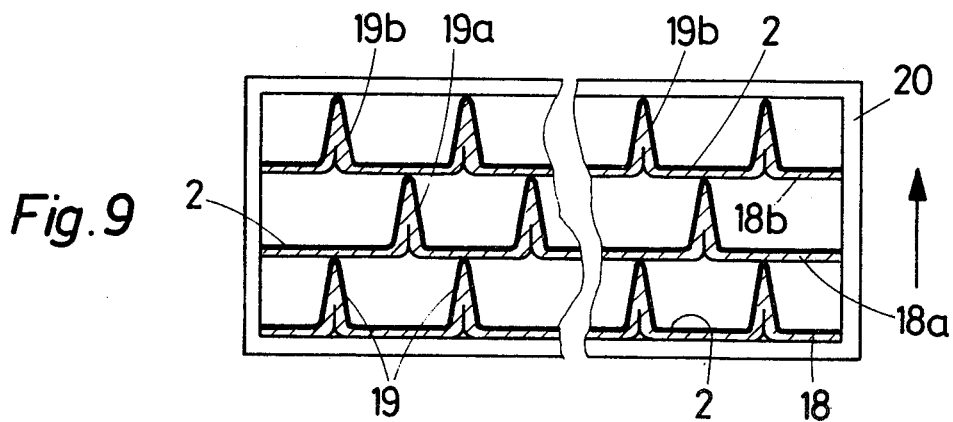
FIG. 9 is another cross-sectional view showing a further modified form of embodiment.

In the example of FIG. 9 the insulating material consists of plastic films 18, 18a and 18b having integral ribs or spike-shaped projections 19, 19a and 19b which, for this purpose, are obtained by deformation in the heated condition, for example with the assistance of rib- or spike-forming rolls, or of plates provided with corresponding relief patterns. Such embossed films can be manufactured for example from PVC film stock of a thickness of, say, about 100 microns. Of course, the films 18, 18a and 18b may also consist of paper or pasteboard. In the example illustrated in FIG. 9, the projections should not form any air-cushion but act only as distance-pieces or spacers, preferably by having a height of about 1 to about 1.5 mm, providing a corresponding relative spacing relative to the adjacent layer. For this purpose the projections may be so narrow that the two walls forming each projection may form at least partially a compact mass, without any cavity, which may contact or adhere to each other. The films 18, 18a and 18b, on their surfaces formed with said ribs or projections, are provided with metallized layers 2, and furthermore they are freely superimposed to one another and held together by means of an external frame 20. Of course, the metal layer may also cover the other side of the film, but then the latter in a practical embodiment would have to be directed the other way relative to the heat source.

The invention should not be construed as being limited by the specific forms of embodiment described hereinabove with reference to the attached drawings, since it encompasses all the various configurations, combinations and materials in which the heat-insulating material comprises any types of cavities limited unilaterally by metal layers. The web or webs may consist of any suitable material, such and more particularly paper, pasteboard, cardboard, plastics or glass. In addition, any desired number of material layers may be contemplated, according to the desired efficiency of the heat-insulating material. A heat-insulating material constituting the six-layer structure of the form of embodiment illustrated in FIGS. 2 or 4 is capable of producing a heat-insulating effect comparing favorably with that of a common Thermos container or bottle. The heat-insulating material according to the instant invention is also adequate for cold-insulation applications in which however the metal layers must be directed towards the cooled object or the space to be kept cool.

What is claimed is:

1. Multi-ply heat-insulating structure of which one side is exposed to heat, comprising a plurality of superposed webs of non-metallic supporting material assembled with cavities between successive webs, and a thin reflective metal layer bonded on one face only of each web facing said cavities, said cavities having a depth not less than 1 mm and said metal layer having a thickness of 1 to 20 microns and being on that face of the respective web which faces away from the side of said structure exposed to heat.

2. Multi-ply heat-insulating structure according to claim 1, wherein the thickness of said metal layer is 10 microns.

3. Multi-ply heat-insulating structure according to claim 1, wherein said cavities have a depth in the range of 1 to 4 mm in the direction of thickness of said structure.

4. Multi-ply heat-insulating structure according to claim 1, wherein said structure comprises planar webs alternating with corrugated webs with a metal coating on said planar webs and said corrugated webs.

5. Multi-ply heat-insulating structure according to claim 4, wherein the metal layer on said corrugated webs is thinner than on said planar webs.

6. Multi-ply heat-insulating structure according to claim 1, wherein said structure comprises at least one planar web and a plurality of corrugated webs with adjacent corrugated webs shifted one half wave length relative to one another, said corrugated webs being adhesively bonded to one another in mutual contact.

7. Mutli-ply heat-insulating structure according to claim 1, wherein said webs comprise superposed webs of foam material each having one plain face and one face having cavities formed therein, said metal layer being applied to said plain face.

8. Multi-ply heat-insulating structure according to claim 1, wherein successive webs are spaced apart by a multiplicity of projections formed on one of each pair of adjacent webs.

9. Multi-ply heat-insulating structure according to claim 1, wherein adjacent webs are spaced apart by a multiplicity of spikes formed on said webs and projecting from one side of the respective web.

10. Multi-ply heat-insulating structure according to claim 9, wherein said spikes have a height of about 1 to 1.5 mm.

* * * * *